US012585126B2

(12) United States Patent
Jing et al.

(10) Patent No.: US 12,585,126 B2
(45) Date of Patent: Mar. 24, 2026

(54) ELECTRONIC DEVICE AND ROTATING SHAFT MECHANISM THEREOF

(71) Applicants: Beijing BOE Optoelectronics Technology Co., Ltd., Beijing (CN); BOE Technology Group Co., Ltd., Beijing (CN)

(72) Inventors: Haoran Jing, Beijing (CN); Zhanshan Ma, Beijing (CN); Ke Li, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 253 days.

(21) Appl. No.: 18/370,930

(22) Filed: Sep. 21, 2023

(65) Prior Publication Data

US 2024/0012258 A1     Jan. 11, 2024

Related U.S. Application Data

(63) Continuation-in-part of application No. 17/416,554, filed as application No. PCT/CN2020/130093 on Nov. 19, 2020, now Pat. No. 11,874,709.

(51) Int. Cl.
G02B 27/01     (2006.01)
G02C 5/22     (2006.01)

(52) U.S. Cl.
CPC ....... G02B 27/0176 (2013.01); G02C 5/2227 (2013.01); G02B 2027/0178 (2013.01)

(58) Field of Classification Search
None
See application file for complete search history.

(56) References Cited

U.S. PATENT DOCUMENTS

| | | | |
|---|---|---|---|
| 5,889,575 A | 3/1999 | Wang | |
| 6,168,341 B1 | 1/2001 | Chene et al. | |
| 10,353,221 B1 | 7/2019 | Graff et al. | |
| 11,543,679 B2 * | 1/2023 | Ryner | G02C 5/2245 |
| 11,874,709 B2 * | 1/2024 | Jing | F16C 11/045 |
| 2003/0147045 A1 | 8/2003 | Fukuoka | |

(Continued)

FOREIGN PATENT DOCUMENTS

| | | |
|---|---|---|
| CN | 2107028 U | 6/1992 |
| CN | 1216083 A | 5/1999 |

(Continued)

OTHER PUBLICATIONS

PCT/CN2020/130093 international search report.

(Continued)

*Primary Examiner* — Anthony Q Edwards
*Assistant Examiner* — Rashen E Morrison
(74) *Attorney, Agent, or Firm* — IPro, PLLC

(57) ABSTRACT

Provided is a rotating shaft mechanism of an electronic device. A first fixing assembly and a second fixing assembly in the rotating shaft mechanism are connected to each other by a first connector and a second connector. A hollow region can be reserved in the rotating shaft mechanism as the first connector and the second connector may be shorter. Thus, an external circuit of the electronic device can pass through the hollow region and be disposed in a second body of the electronic device. An electronic device is also provided.

12 Claims, 9 Drawing Sheets

(56) References Cited

U.S. PATENT DOCUMENTS

| | | | |
|---|---|---|---|
| 2012/0155032 A1 | 6/2012 | Shih | |
| 2012/0200934 A1 | 8/2012 | Fujishiro | |
| 2016/0091732 A1 | 3/2016 | Wang | |
| 2019/0235274 A1 | 8/2019 | Jouard et al. | |
| 2019/0250412 A1 | 8/2019 | Jiang | |
| 2021/0063774 A1* | 3/2021 | Wang ..................... | H05K 1/189 |
| 2021/0064096 A1 | 3/2021 | Channaiah et al. | |
| 2021/0116719 A1 | 4/2021 | Wang et al. | |

FOREIGN PATENT DOCUMENTS

| | | |
|---|---|---|
| CN | 200944161 Y | 9/2007 |
| CN | 204212575 U | 3/2015 |
| CN | 205139498 U | 4/2016 |
| CN | 206377138 U | 8/2017 |
| CN | 108196629 A | 6/2018 |
| CN | 108457545 A | 8/2018 |
| CN | 108644224 A | 10/2018 |
| CN | 108761795 A | 11/2018 |
| CN | 108776393 A | 11/2018 |
| CN | 208506406 U | 2/2019 |
| CN | 109782447 A | 5/2019 |
| CN | 208883227 U | 5/2019 |
| CN | 110131542 A | 8/2019 |
| CN | 110673343 A | 1/2020 |
| CN | 110908122 A | 3/2020 |
| CN | 111610828 A | 9/2020 |
| CN | 111624773 A | 9/2020 |
| KR | 101893953 B1 | 9/2018 |
| WO | 2012035382 A1 | 3/2012 |
| WO | 2020038486 A1 | 2/2020 |

OTHER PUBLICATIONS

CN202080002898.X first office action.

U.S. Appl. No. 17/416,554 Non-final office Action dated Jun. 2, 2023.

U.S. Appl. No. 17/416,554 Notice of allowance dated Sep. 8, 2023.

EP20961933.7 Extended European search report.

* cited by examiner

1041

10411

10412

1024

1022

1024a

102a

1021

102a

ELECTRONIC DEVICE AND ROTATING SHAFT MECHANISM THEREOF

CROSS-REFERENCE TO RELATED APPLICATION

This application is a continuation-in-part application of U.S. application Ser. No. 17/416,554, filed on Jun. 21, 2021, which is a US national stage of international application No. PCT/CN2020/130093, filed on Nov. 19, 2020, the disclosure of both of which is herein incorporated by reference in its entirety.

TECHNICAL FIELD

The present disclosure relates to the field of mechanical technologies, and in particular, relates to an electronic device and a rotating shaft mechanism thereof.

BACKGROUND

A wearable device like a pair of glasses may include: a casing for encapsulating a display screen, and two temples which may be respectively rotatably connected to one end of the casing. When in use, the temples may be rotated in a direction distal from the casing for the convenience of a user in wearing the glasses. Where the glasses are not used, the temples may be folded in a direction proximal to the casing to reduce a space occupied by the wearable device.

SUMMARY

The present disclosure provides an electronic device and a rotating shaft mechanism thereof. The technical solutions are as follows.

In one aspect, a rotating shaft mechanism of an electronic device is provided. The rotating shaft mechanism includes:

a first fixing assembly, configured to be fixedly connected to a first body of the electronic device;

a second fixing assembly, configured to be fixedly connected to a second body of the electronic device; and a first connector and a second connector, wherein the first connector is rotatably connected to the first fixing assembly and one end of the second connector, and the other end of the second connector is fixedly connected to the second fixing assembly;

wherein a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly.

Optionally, the second connector includes: a first connecting portion having a rod shape, a second connecting portion, and a third connecting portion having a rod shape; wherein one end of the first connecting portion is rotatably connected to the first fixing assembly by the first connector, and a first through hole is formed in the other end of the first connecting portion; and the second connecting portion is disposed in the first through hole, the second connecting portion is fixedly connected to one end of the third connecting portion, and the other end of the third connecting portion is fixedly connected to the second fixing assembly;

wherein a sum of lengths of the second connecting portion and the third connecting portion in an axial direction of the first through hole is greater than a depth of the first through hole.

Optionally, the first through hole includes: a first sub-through hole and a second sub-through hole which are coaxial, wherein the first sub-through hole is distal from the first fixing assembly relative to the second sub-through hole, and an aperture of the first sub-through hole is less than an aperture of the second sub-through hole; wherein the second connecting portion is disposed in the second sub-through hole, and a diameter of the second connecting portion is greater than the aperture of the first sub-through hole and less than the aperture of the second sub-through hole; and a diameter of the third connecting portion is less than the aperture of the first sub-through hole.

Optionally, the second connector further includes: an elastic member sleeved onto the third connecting portion;

wherein the elastic member is disposed in the second sub-through hole, and a diameter of the elastic member is greater than the aperture of the first sub-through hole and less than the aperture of the second sub-through hole.

Optionally, the elastic member includes at least one spring.

Optionally, a groove in communication with the first through hole is formed in a side wall of the first connecting portion, and an extending direction of the groove is parallel to an extending direction of the first connecting portion.

Optionally, the first fixing assembly includes: a first supporting plate and a connecting plate fixedly connected to the first supporting plate;

wherein the connecting plate is perpendicular to the first supporting plate, is disposed on one side of the first supporting plate proximal to the second fixing assembly, and is rotatably connected to the first connector.

Optionally, the first connector is a rod-shaped structure; the connecting plate includes a first plate body and a second plate body which are spaced apart in the target direction, wherein the first plate body is parallel to the second plate body, and a distance between the first plate body and the second plate body is less than or equal to the length of the first connector in the target direction;

one end of the second connector is disposed between the first plate body and the second plate body; and a second through hole is formed in the first plate body, a third through hole is formed in the second plate body, and a fourth through hole is formed in one end of the second connector, wherein the first connector is disposed in the second through hole, the third through hole, and the fourth through hole.

Optionally, the first fixing assembly further includes: a limiting plate fixedly connected to the first supporting plate;

wherein the limiting plate is disposed on one side of the first supporting plate proximal to the second fixing assembly, and a gap is defined between the limiting plate and the connecting plate in the target direction.

Optionally, the limiting plate includes: a third plate body and a fourth plate body which are spaced apart in the target direction and opposite to each other;

wherein the second fixing assembly includes: a second supporting plate, and a fifth plate body fixedly connected to the second supporting plate, wherein the fifth plate body is disposed on one side of the second supporting plate proximal to the first fixing assembly, and is disposed between the third plate body and the fourth plate body.

Optionally, the second fixing assembly includes: a second supporting plate and a connecting structure fixedly connected to the second supporting plate;

wherein the connecting structure is disposed on one side of the second supporting plate distal from the first fixing assembly, and a fifth through hole is formed in the connecting structure, an axis of the fifth through hole being parallel to the second supporting plate; and wherein the other end of the second connector is disposed in the fifth through hole and is fixedly connected to the second fixing assembly.

Optionally, a sixth through hole is further formed in the connecting structure, wherein an axis of the sixth through hole is perpendicular to the second supporting plate, and intersected with the axis of the fifth through hole; and the rotating shaft mechanism further includes: a riveting member;

wherein the riveting member is disposed in the sixth through hole and is fixedly connected to the other end of the second connector.

Optionally, the second fixing assembly further includes: a supporting structure fixedly connected to the second supporting plate;

wherein a seventh through hole is formed in the supporting structure, the second connector being disposed in the seventh through hole;

wherein an axis of the seventh through hole is parallel to the axis of the fifth through hole.

Optionally, the first connector is a screw.

Optionally, at least one first connection through holes is formed in the first fixing assembly, wherein each of the at least one first connection through hole is configured to be connected to the first body of the electronic device.

Optionally, at least one second connection through hole is formed in the second fixing assembly, wherein each of the at last one second connection through hole is configured to be connected to the second body of the electronic device.

In another aspect, an electronic device is provided. The electronic device includes a first body, a second body, and the rotating shaft mechanism as described above;

wherein the first body and the second body are rotatably connected by the rotating shaft mechanism.

Optionally, the electronic device further includes an electronic element and an external circuit connected to the electronic element; wherein the electronic element is disposed in the first body, one end of the external circuit is connected to the electronic element, and the other end of the external circuit passes through a hollow region in the rotating shaft mechanism to be disposed in the second body; and wherein the hollow region includes: a region not shielded by the first connector in the first fixing assembly of the rotating shaft mechanism, and a region not shielded by the second connector in the second fixing assembly of the rotating shaft mechanism.

Optionally, the electronic device is a wearable device, wherein the wearable device further includes: a display screen;

wherein the first body is a casing for encapsulating the display screen, and the second body is a temple of the wearable device.

Optionally, the wearable device is a virtual reality device or an augmented reality device.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter with reference to the accompanying drawings.

In the related art, the wearable device like the glasses may further include an electronic element and an external circuit. The electronic element may be disposed in the casing, and the external circuit may be disposed outside the casing and is connected to the electronic element to provide a signal for the electronic element.

However, the external circuit outside the casing is prone to damages, resulting in poorer reliability of the wearable device.

Figure 1:
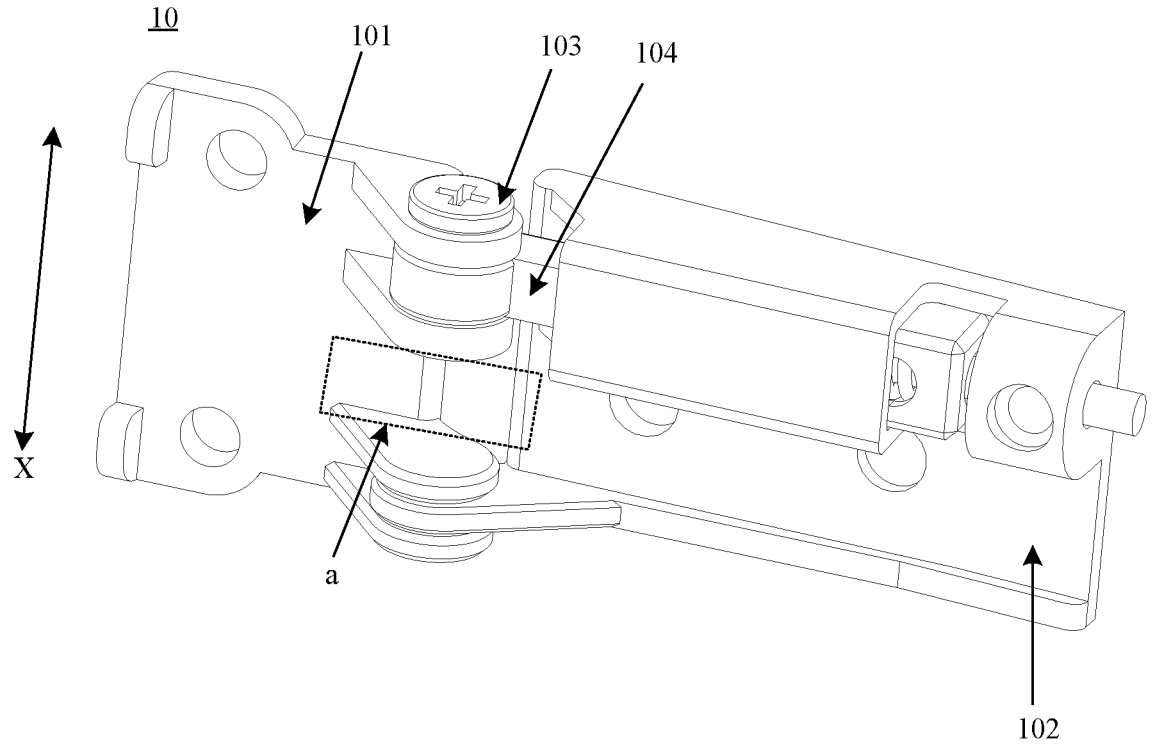
FIG. 1 is a schematic structure diagram of a rotating shaft mechanism of an electronic device according to an embodiment of the present disclosure.
Figure 2:
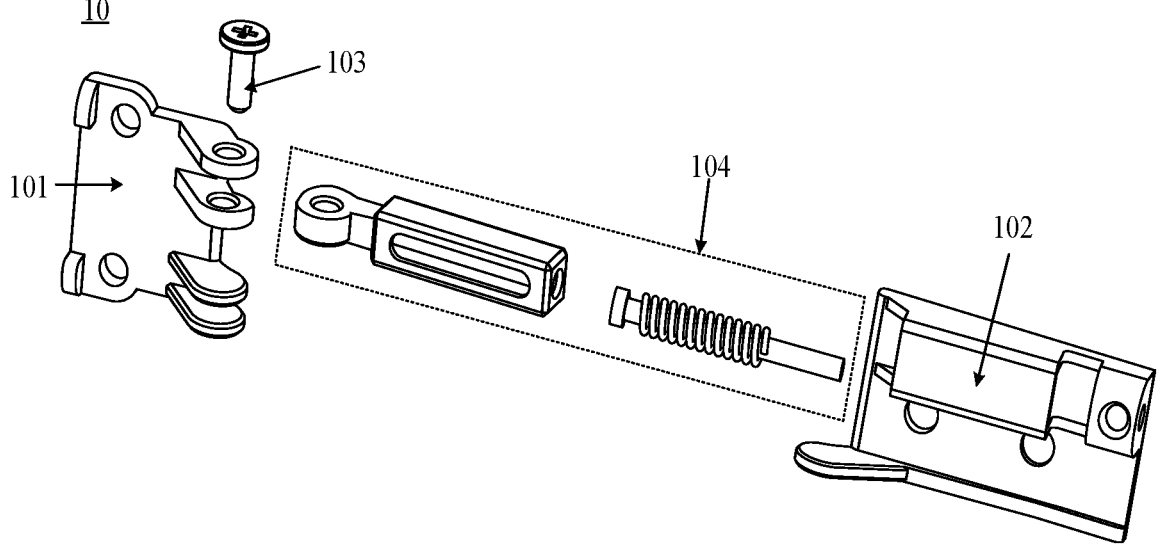
FIG. 2 is an explosive schematic diagram of the rotating shaft mechanism shown in FIG. 1.
Figure 11:
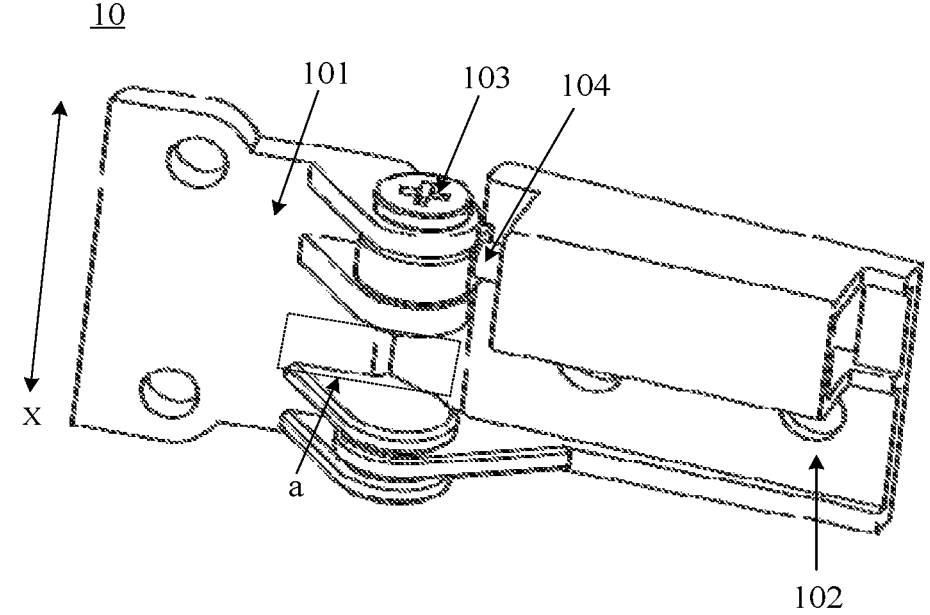
FIG. 11 is a schematic structure diagram of a rotating shaft mechanism of still another electronic device according to an embodiment of the present disclosure.
Figure 12:
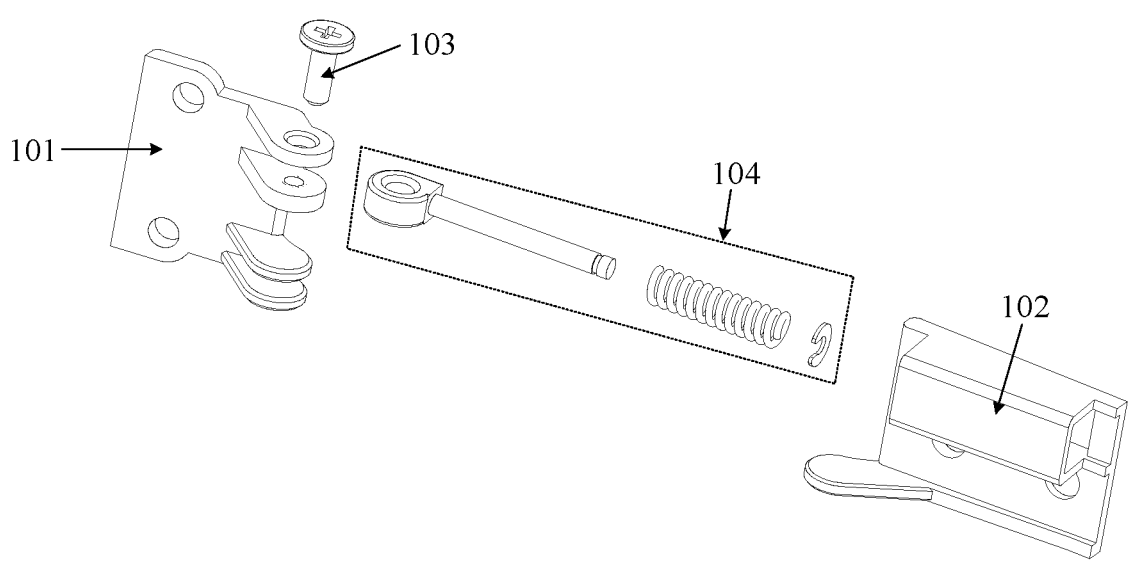
FIG. 12 is an explosive schematic diagram of the rotating shaft mechanism shown in FIG. 11.

FIG. 1 is a schematic structure diagram of a rotating shaft mechanism of an electronic device according to an embodiment of the present disclosure. FIG. 2 is an explosive schematic diagram of the rotating shaft mechanism shown in FIG. 1. FIG. 11 is a schematic structure diagram of a rotating shaft mechanism of still another electronic device according to an embodiment of the present disclosure. FIG. 12 is an explosive schematic diagram of the rotating shaft mechanism shown in FIG. 11. Referring to FIGS. 1, 2, 11, and 12, the rotating shaft mechanism 10 may include: a first fixing assembly 101, a second fixing assembly 102, a first connector 103, and a second connector 104.

In the embodiment of the present disclosure, the first connector 103 may be rotatably connected to the first fixing assembly 101 and one end of the second connector 104. In addition, the other end of the second connector 104 may be fixedly connected to the second fixing assembly 102. Thus, the first fixing assembly 101 and the second fixing assembly 102 can be rotatably connected to each other.

Since the first fixing assembly 101 is configured to be fixedly connected to a first body of the electronic device and the second fixing assembly 102 is configured to be fixedly connected to a second body of the electronic device, the first body and the second body may be rotated relatively when the first fixing assembly 101 and the second fixing assembly 102 are rotated relatively. That is, the rotational connection between the first body and the second body of the electronic device can be achieved by arranging the rotating shaft mechanism according to the embodiment of the present disclosure in the electronic device.

In the embodiment of the present disclosure, a length of the first connector 103 in a target direction X and a length of the second connector 104 in the target direction X are both less than a length of the first fixing assembly 101 in the target direction X, and are both less than a length of the second fixing assembly 102 in the target direction X. The target direction X refers to an extending direction of a rotation axis of the first fixing assembly 101 and the second fixing assembly 102.

That is, the first connector 103 and the second connector 104 are both shorter, and thus, a hollow region A for placing an external circuit of the electronic device can be reserved in the rotating shaft mechanism. Thus, the external circuit of the electronic device may pass through the hollow region A of the rotating shaft mechanism and be disposed in the second body. The second body can protect the external circuit to avoid damages to the external circuit, such that the reliability of the electronic device is higher. In addition, the external circuit is disposed in the second body, and thus, the aesthetics of the electronic device is better.

In summary, the present disclosure provides the rotating shaft mechanism of the electronic device, and the first fixing assembly and the second fixing assembly in the rotating shaft mechanism are connected to each other by the first connector and the second connector. The hollow region can be reserved in the rotating shaft mechanism as the first connector and the second connector may be shorter. Thus, the external circuit of the electronic device may pass through the hollow region and be disposed in the second body of the electronic device. The second body can protect the external circuit to avoid damages to the external circuit, such that the reliability of the electronic device is higher. In addition, since the external circuit is disposed in the second body of the electronic device, the aesthetics of the electronic device is better.

In the embodiments of the present disclosure, the specific structural form of the second connector and the second fixing assembly includes the following two possible implementations. These two possible implementations are illustrated specifically as follows.

Figure 3:
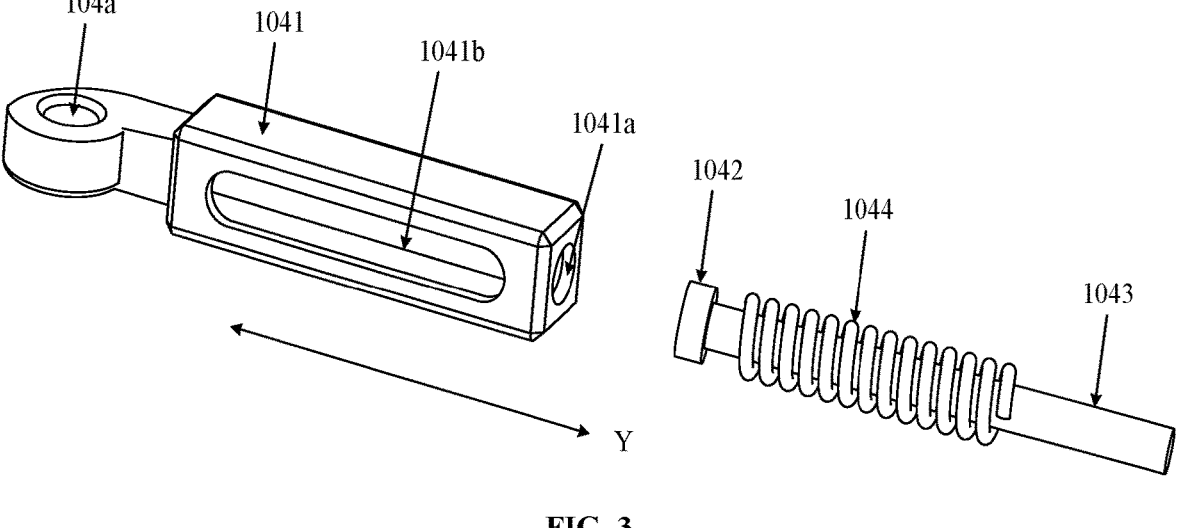
FIG. 3 is a schematic structure diagram of a second connector according to the embodiment of the present disclosure.

In the first possible implementation, FIG. 3 is a schematic structure diagram of a second connector according to the embodiment of the present disclosure. Referring to FIG. 3, the second connector 104 may include: a first connecting portion having a rod shape 1041, a second connecting portion 1042, and a third connecting portion having a rod shape 1043.

One end of the first connecting portion 1041 may be rotatably connected to the first fixing assembly 101 by the first connector 103, and a first through hole 1041*a* may be formed in the other end of the first connecting portion 1041. The second connecting portion 1042 may be disposed in the first through hole 1041*a*, and the second connecting portion 1042 may be fixedly connected to one end of the third connecting portion 1043, and the other end of the third connecting portion 1043 may be fixedly connected to the second fixing assembly 102.

Here, a sum of lengths of the second connecting portion 1042 and the third connecting portion 1043 in an axial direction Y of the first through hole 1041*a* may be greater than a depth of the first through hole 1041*a*. That is, the second connecting portion 1042 is disposed in the first through hole 1041*a*, and part of the third connecting portion 1043 is disposed in the first through hole 1041*a*, and the remaining part of the third connecting portion 1043 is disposed outside the first through hole 1041*a*.

In the embodiment of the present disclosure, the second connecting portion 1042 and the third connecting portion 1043 may be an integral structure, namely, may be manufactured by a one-time manufacturing process; or, the second connecting portion 1042 and the third connecting portion 1043 may be manufactured by twice manufacturing processes, and the second connecting portion 1042 is connected to one end of the third connecting portion 1043 upon completion of the manufacturing.

Figure 4:
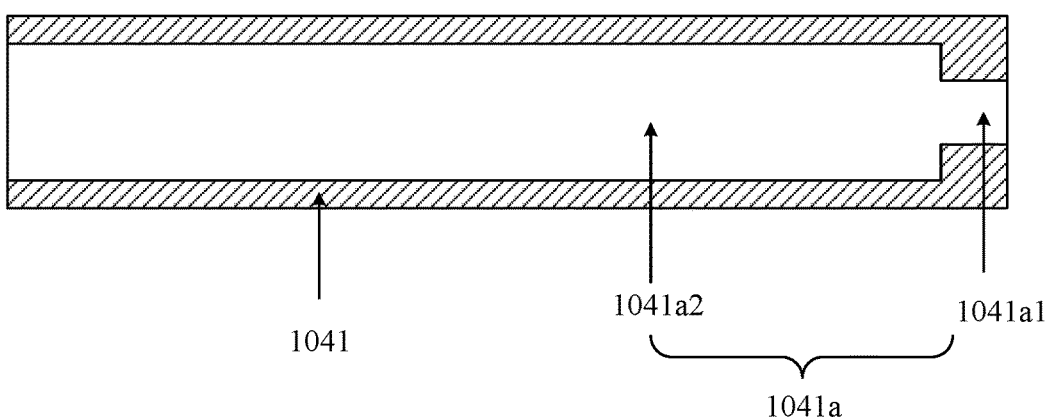
FIG. 4 is a sectional view of a first connecting portion according to an embodiment of the present disclosure.

FIG. 4 is a sectional view of a first connecting portion according to an embodiment of the present disclosure. Referring to FIG. 4, the first through hole 1041*a* may include a first sub-through hole 1041*a*1 and a second sub-through hole 1041*a*2 which are coaxial. The first sub-through hole 1041 al is distal from the first fixing assembly 101 relative to the second sub-through hole 1041*a*2, and an aperture of the first sub-through hole 1041 al is less than an aperture of the second sub-through hole 1041*a*2. The second connecting portion 1042 may be disposed in the second sub-through hole 1041*a*2, and a diameter of the second connecting portion 1042 is greater than the aperture of the first sub-through hole 1041*a*1 and less than the aperture of the second sub-through hole 1041*a*2. A diameter of the third connecting portion 1043 is less than the aperture of the first sub-through hole 1041*a*1.

The second connecting portion 1042 is disposed in the second sub-through hole 1041*a*2, and one end of the third connecting portion 1043 is connected to the second connecting portion 1042, and the other end of the third connecting portion 1043 may pass through the first sub-through hole 1041*a*1 to be connected to the second fixing assembly 102.

In the embodiment of the present disclosure, by setting the greater diameter of the second connecting portion 1042, the second connecting portion 1042 may be prevented from being pulled out by the third connecting portion 1042, such that the second connecting portion 1042 is always disposed in the sub-through hole 1041a2, thereby ensuring the reliability of the connection between the second connecting portion 1042 and the first connecting portion 1041. In addition, by setting the less diameter of the third connecting portion 1043, the third connecting portion 1043 can pass through the first sub-through hole 1041 al to be connected to the second fixing assembly 102, such that the reliability of the connection between the second connector 104 and the second fixing assembly 102 is ensured.

Referring to FIG. 3, the second connector 104 may further include: an elastic member 1044 sleeved onto the third connecting portion 1043. The elastic member 1044 may be disposed in the second sub-through hole 1041a2, and a diameter of the elastic member 1044 may be greater than the aperture of the first sub-through hole 1041 al and less than the aperture of the second sub-through hole 1041a2.

Figure 5:
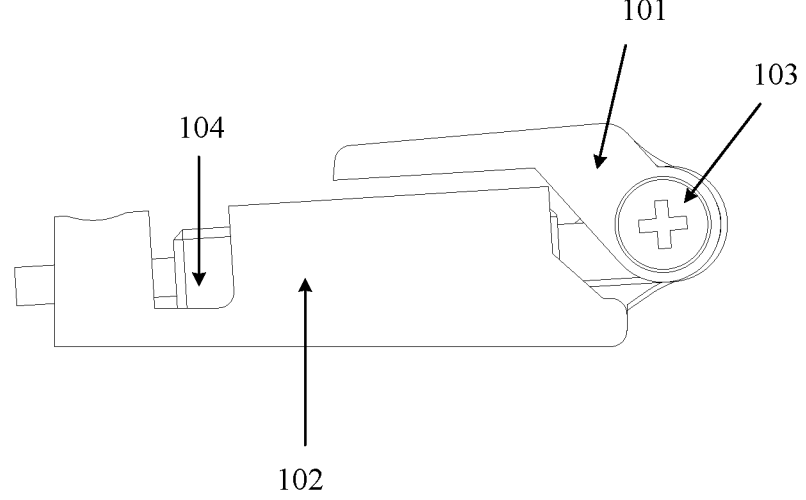
FIG. 5 is a schematic structure diagram of a rotating shaft mechanism of another electronic device according to an embodiment of the present disclosure.
Figure 6:
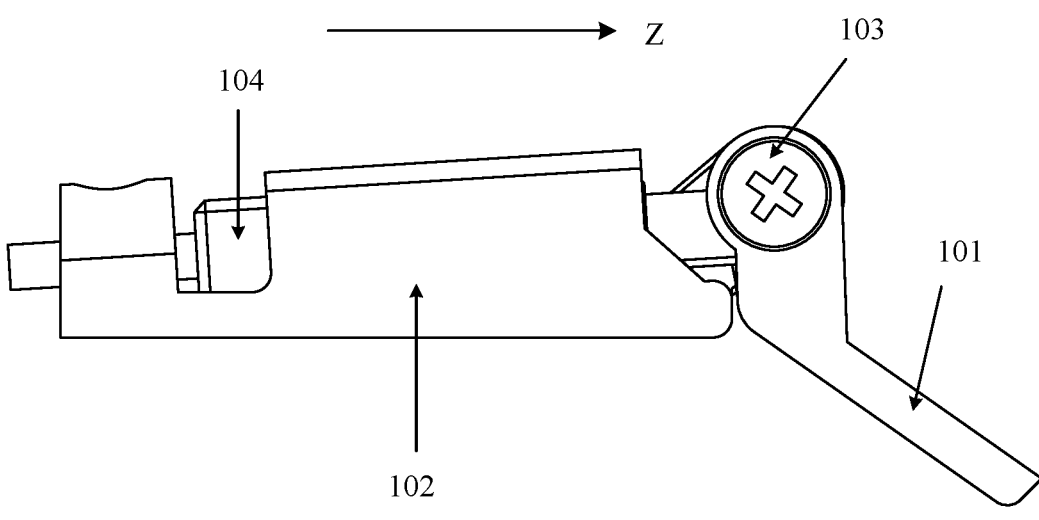
FIG. 6 is a schematic structure diagram of a rotating shaft mechanism of yet another electronic device according to an embodiment of the present disclosure.

In an exemplary embodiment, when the rotating shaft mechanism 10 is rotated from a state in FIG. 5 to a state in FIG. 6, the first connecting portion 1041 in the second connector 104 may move toward one side (a Z direction in FIG. 6) proximal to the first fixing assembly 101, such that the elastic member 1044 disposed in the second sub-through hole 1041a2 can be compressed under the action of the second connecting portion 1042. In this case, the elastic member 1044 may generate a reverse force which may endow the rotating shaft mechanism 10 with a resilient force. Here, a direction of the reverse force is in a direction (opposite to the Z direction) toward the second fixing assembly 102.

Optionally, a rotation angle of the first fixing assembly 101 and the second fixing assembly 102 may range from 0 degrees to 220 degrees. For example, the rotation angle of the first fixing assembly 101 and the second fixing assembly 102 may be 200 degrees.

Assuming that the electronic device is an eyeglass-type wearable device, when a user wears the electronic device, the rotation angle of the first fixing assembly 101 and the second fixing assembly 102 is greater than 90 degrees, indicating that a head circumference of a user is greater. At this time, the elastic member 1044 may generate a reverse force, such that the head of the user is clamped with the resilient force of the rotating shaft mechanism 10, thereby preventing the wearable device from falling from the head of the user.

Optionally, referring to FIG. 3, the elastic member 1044 may include at least one spring. The elastic member 1044 may also be other elastic structures, and the type of the elastic member 1044 is not limited in the embodiments of the present disclosure.

Referring to FIG. 3, a groove 1041b in communication with the first through hole 1041a may be formed in a side wall of the first connecting portion 1041, and an extending direction of the groove 1041b may be parallel to an extending direction of the first connecting portion 1041. By forming the groove 1041b in the side wall of the first connecting portion 1041, it is convenient for the user to check the movement of the second connecting portion 1042 in the first connecting portion 1041 by the groove 1041b.

In the embodiment of the present disclosure, since the second connecting portion 1042 is fixedly connected to one end of the third connecting portion 1043 and the diameter of the second connecting portion 1042 is greater than the aperture of the first sub-through hole 1041 al, the second connecting portion 1042 cannot be disposed in the first connecting portion 1041 from one side of the first sub-through hole 1041a1.

Figure 7:
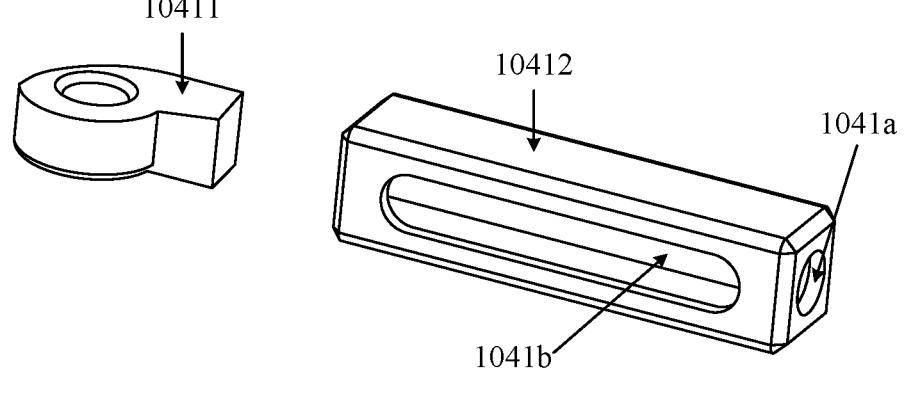
FIG. 7 is a schematic structure diagram of a first connecting portion according to an embodiment of the present disclosure.

Thus, referring to FIG. 7, the first connecting portion 1041 may include: a first connecting part 10411 and a second connecting part 10412. A connecting rod (not shown in the figure) may be provided at one end of the first connecting part 10411 proximal to the second connecting part 10412. Accordingly, a connecting hole (not shown in the figure) may be formed in one end of the second connecting part 10412 proximal to the first connecting part 10411, and may be part of the first through hole 1041a proximal to the first fixing assembly 101.

In the embodiment of the present disclosure, an assembling process of the first connecting portion 1041, the second connecting portion 1042, the third connecting portion 1043, and the elastic member 1044 may be as follows. Firstly, the elastic member 1044 sleeves the third connecting portion 1043. Secondly, the second connecting portion 1042, the third connecting portion 1043, and the elastic member 1044 are placed in the first through hole 1041a from one side of the connecting hole, such that the second connecting portion 1042 is proximal to the first connecting part 10411 relative to the third connecting portion 1043. Finally, the connecting rod of the first connecting part 10411 is connected to the connecting hole of the second connecting part 10412.

Optionally, an external thread may be disposed on the outer side of the connecting rod, and the connecting hole may have an internal thread. That is, the first connecting part 10411 and the second connecting part 10412 may be in threaded connection with each other.

Figure 9:
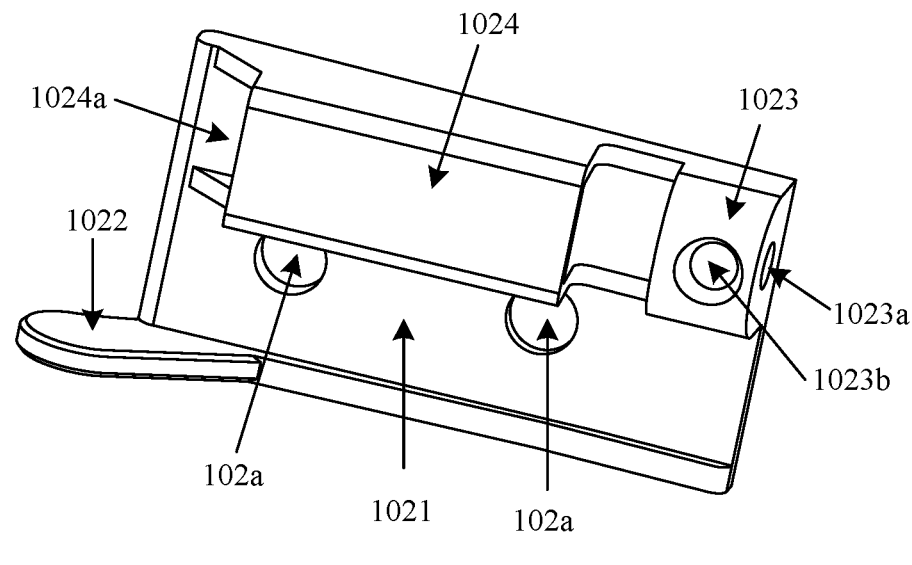
FIG. 9 is a schematic structure diagram of a second fixing assembly according to an embodiment of the present disclosure.

FIG. 9 is a schematic structure diagram of a second fixing assembly according to an embodiment of the present disclosure. Referring to FIG. 9, the second fixing assembly 102 may include: a second supporting plate 1021, and a fifth plate body 1022 fixedly connected to the second supporting plate 1021. The fifth plate body 1022 may be disposed on one side of the second supporting plate 1021 proximal to the first fixing assembly 101, and is used to connect to the first fixing assembly 101.

Referring to FIG. 9, the second fixing assembly 102 may further include: a connecting structure 1023 fixedly connected to the second supporting plate 1021. The connecting structure 1023 may be disposed on one side of the second supporting plate 1021 distal from the first fixing assembly 101. A fifth through hole 1023a may be formed in the connecting structure 1023. The axis of the fifth through hole 1023a may be parallel to the second supporting plate 1021. The other end of the second connector 104 may be disposed in the fifth through hole 1023a, and the other end of the second connector 104 may be fixedly connected to the second fixing assembly 102.

Optionally, referring to FIG. 9, a sixth through hole 1023b is further formed in the connecting structure 1023. An axis of the sixth through hole 1023b may be perpendicular to the second supporting plate 1021, and intersected with the axis of the fifth through hole 1023a.

The other end of the second connector 104 may be disposed in the fifth through hole 1023a, and is fixedly connected to the second fixing assembly 102 by the sixth through hole 1023b. By forming the fifth through hole 1023a and the sixth through hole 1023b in the connecting structure 1023 of the second fixing assembly 102, the second connector 104 and the second fixing assembly 102 can be connected conveniently, such that the connection reliability is ensured.

Optionally, the rotating shaft mechanism 10 may further include a riveting member (not shown in the figure). The other end of the third connecting portion 1043 in the second connector 104 may be disposed in the fifth through hole 1023*a*. The riveting member may pass through the sixth through hole 1023*b* to be fixedly connected to the other end of the third connecting portion 1043. Thus, the third connecting portion 1043 may be fixed in the fifth through hole 1023*a*, thereby ensuring the reliability of the connection between the second connector 104 and the second fixing assembly 102.

Referring to FIG. 9, the second fixing assembly 102 may further include: a supporting structure 1024 fixedly connected to the second supporting plate 1021. A seventh through hole 1024*a* is formed in the supporting structure 1024. The second connector 104 may be disposed in the seventh through hole 1024*a*. The axis of the seventh through hole 1024*a* may be parallel to the axis of the fifth through hole 1023*a*. By disposing the supporting structure 1024 in the second fixing assembly 102, the second connector 104 may be disposed in the seventh through hole 1024*a* of the supporting structure 1024, such that support is provided for the second connector 104, thereby ensuring the reliability of the connection between the second connector 104 and the second fixing assembly 102.

The second supporting plate 1021, the fifth plate body 1022, the connecting structure 1023, and the supporting structure 1024 included in the second fixing assembly 102 may be an integral structure. That is, the second supporting plate 1021, the fifth plate body 1022, the connecting structure 1023, and the supporting structure 1024 may be manufactured by one manufacturing process. The second supporting plate 1021, the fifth plate body 1022, the connecting structure 1023, and the supporting structure 1024 may be manufactured by four manufacturing processes respectively; and then, the second supporting plate 1021, the fifth plate body 1022, the connecting structure 1023, and the supporting structure 1024 are connected.

Referring to FIG. 9, at least one second connection through hole 102*a* may be formed in the second fixing assembly 102. Accordingly, at least one fourth connection through hole corresponding to the at least one second connection through hole 102*a* may be formed in the second body. The second fixing assembly 102 may be connected to the second body of the electronic device by the at least one second connection through hole 102*a* and the at least one fourth connection through hole. In an exemplary embodiment, two second connection through holes 102*a* are shown in FIG. 9.

Figure 13:
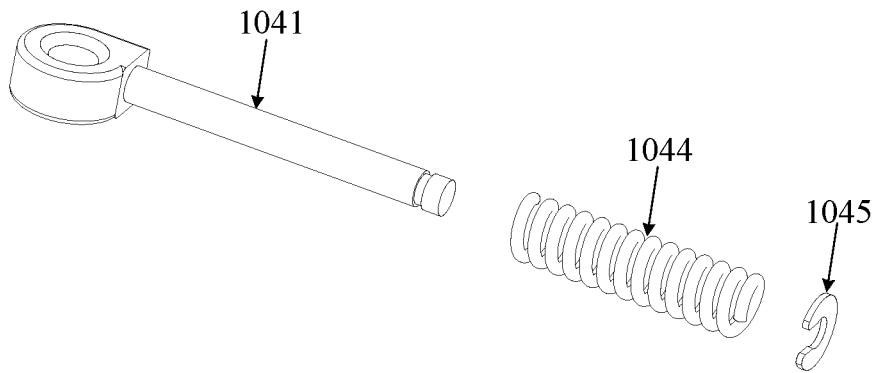
FIG. 13 is a schematic structure diagram of another second connector according to the embodiment of the present disclosure.

In the second possible implementation, FIG. 13 is a schematic structure diagram of another second connector according to the embodiment of the present disclosure. Referring to FIG. 13, the second connector 104 may include: a first connecting porting having a rod shape 1041, an elastic member 1044, and a limiting portion 1045.

one end of the first connecting portion 1041 is rotatably connected to the first fixing assembly 101 by the first connector 1041, the limiting member 1045 is provided at the other end of the first connecting portion 1041.

The elastic member 1044 is arranged on the first connecting portion 1041 and is configured to be compressed in the case that a rotation angle exists between the first fixing assembly 101 and the second fixing assembly 102.

Figure 14:
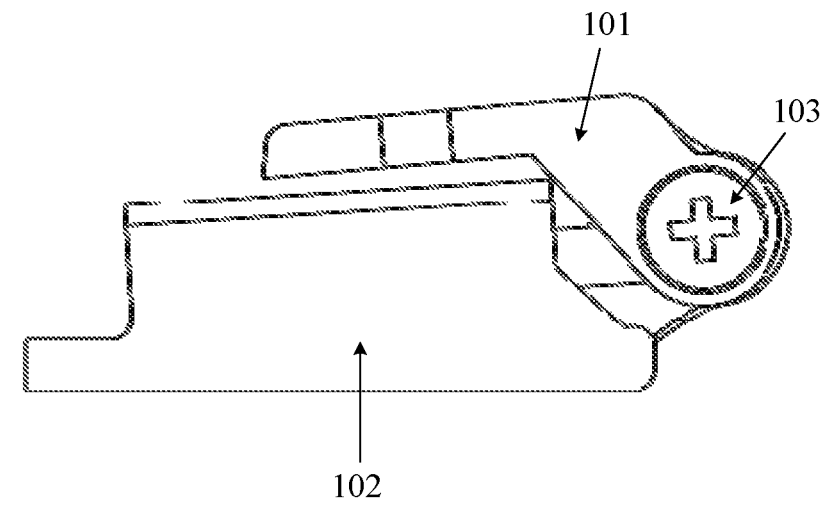
FIG. 14 is a schematic structure diagram of a rotating shaft mechanism of still another electronic device according to an embodiment of the present disclosure.
Figure 15:
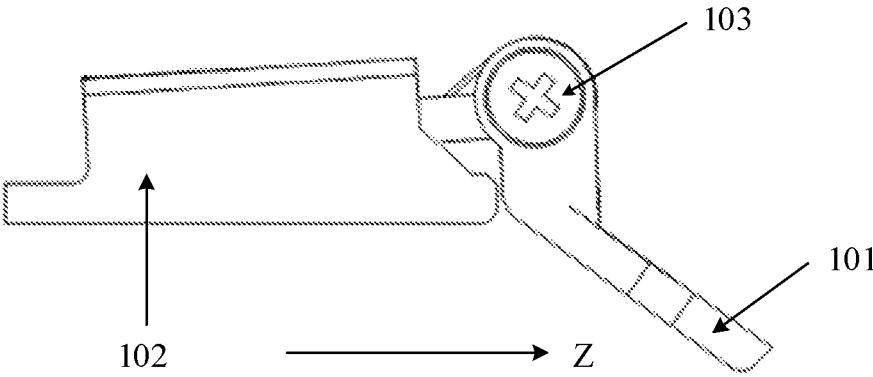
FIG. 15 is a schematic structure diagram of a rotating shaft mechanism of still another electronic device according to an embodiment of the present disclosure.

In an exemplary embodiment, when the rotating shaft mechanism 10 is rotated from a state in FIG. 14 to a state in FIG. 15, the first connecting portion 1041 in the second connector 104 may move toward one side (a Z direction in FIG. 15) proximal to the first fixing assembly 101, such that the elastic member 1044 can be compressed under the joint limiting action of the first fixing assembly 101 and the limiting member 1045. In this case, the elastic member 1044 may generate a reverse force which may endow the rotating shaft mechanism 10 with a resilient force. Here, a direction of the reverse force is in a direction (opposite to the Z direction) toward the second fixing assembly 102.

Optionally, the rotation angle of the first fixing assembly 101 and the second fixing assembly 102 may range from 0 degrees to 220 degrees. For example, the rotation angle of the first fixing assembly 101 and the second fixing assembly 102 may be 200 degrees.

Assuming that the electronic device is an eyeglass-type wearable device, when a user wears the electronic device, the rotation angle of the first fixing assembly 101 and the second fixing assembly 102 is greater than 90 degrees, indicating that a head circumference of a user is greater. At this time, the elastic member 1044 may generate a reverse force, such that the head of the user is clamped with the resilient force of the rotating shaft mechanism 10, thereby preventing the wearable device from falling from the head of the user.

Optionally, referring to FIG. 13, the elastic member 1044 may include at least one spring. The elastic member 1044 may also be other elastic structures, and the type of the elastic member 1044 is not limited in the embodiments of the present disclosure.

Figure 16:
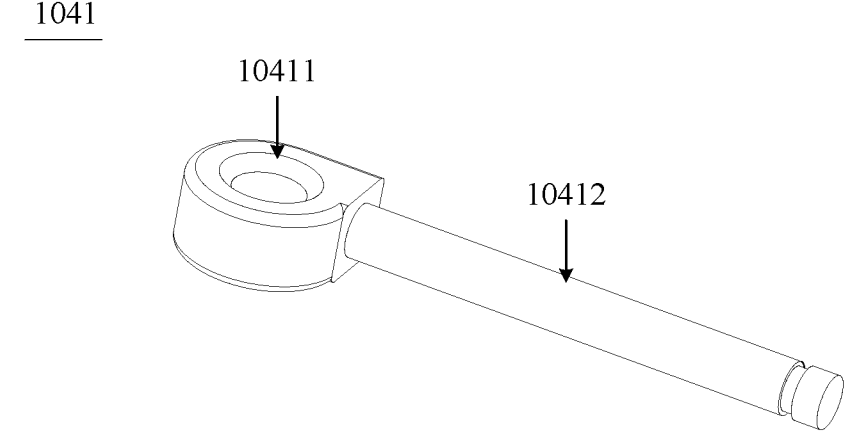
FIG. 16 is a schematic structure diagram of another first connecting portion according to an embodiment of the present disclosure.

Referring to FIG. 16, the first connecting portion 1041 may include: a first connecting part 10411 and a second connecting part 10412. The first connecting part 10411 is used to connect to the first fixing assembly 101, and the second connecting portion 10412 is a rod and is used to fix the elastic member 1044.

In some embodiments, the limiting member 1045 is an annular structure with an opening, which is provided to allow the limiting member 1045 to connect to the second connecting portion 10412. Referring to FIG. 13, the limiting member 1045 may be a "C" type structure.

Referring to FIG. 13, an annular groove 10413 is arranged on the other end of the first connecting portion 1041, and the limiting member 1045 is connected with the first connecting portion 1041 through the annular groove 10413.

In the embodiment of the present disclosure, an assembling process of the first connecting portion 1041, the elastic member 1044, and the limiting portion 1045 may be as follows. The elastic member 1044 is arranged on the second connecting part 10412 of the first connecting portion 1041, and then the limiting portion 1045 is fixed in the annular groove 10413.

Figure 17:
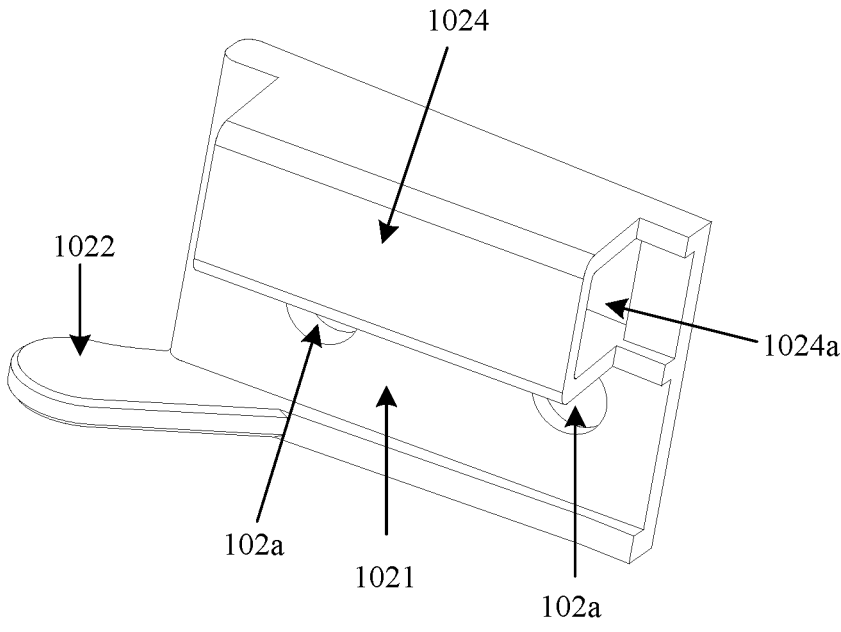
FIG. 17 is a schematic structure diagram of another second fixing assembly according to an embodiment of the present disclosure.

FIG. 17 is a schematic structure diagram of another second fixing assembly according to an embodiment of the present disclosure. Referring to FIG. 17, the second fixing assembly 102 may include: a second supporting plate 1021 and a supporting structure 1024 fixedly connected to the second supporting plate 1021.

A seventh through hole 1024*a* is formed in the supporting structure 1024, a part of the first connecting portion 1041, the elastic member 1044, and the limiting member 1045 are disposed in the seventh through hole 1024*a*, and an axis of the seventh through hole 1024*a* is parallel to the second supporting plate 104.

Referring to FIG. 17, the seventh through hole 1024*a* may be a bar-shaped through hole having a rectangular cross-section.

Figure 18:
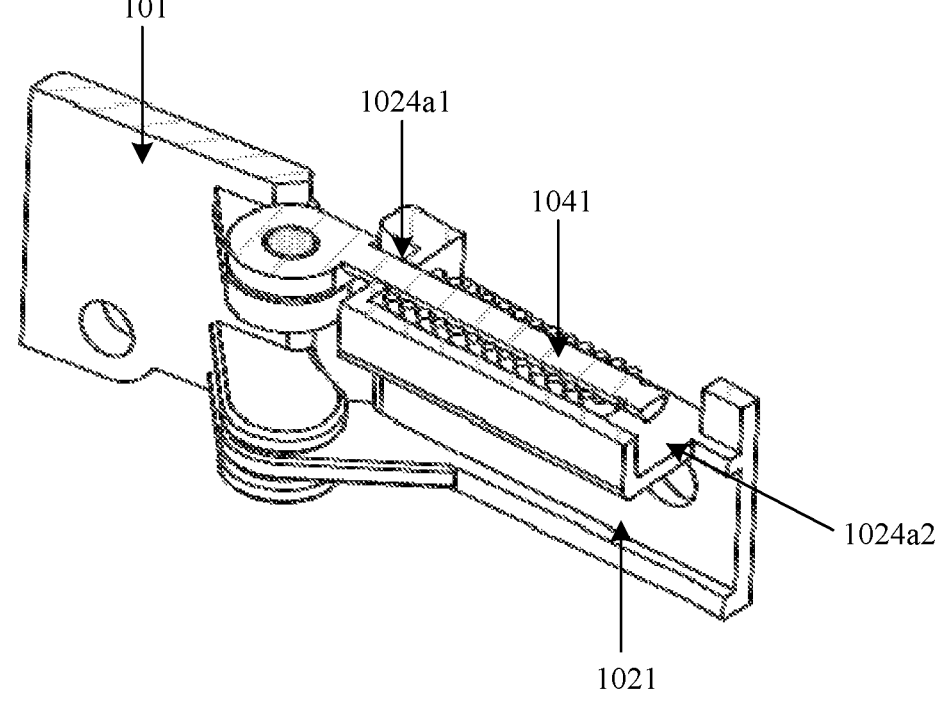
FIG. 18 is a sectional view of the rotating shaft mechanism shown in FIG. 11.

Referring to FIG. 18, the seventh through hole 1024*a* includes: a third sub-through hole 1024*a*1 and a fourth sub-through hole 1024a2 which are coaxial, the third sub-through hole 1024a1 is proximal to the first fixing assembly 101 relative to the fourth sub-through hole 1024a2, and an aperture of the third sub-through hole 1024a2 being less than an aperture of the fourth sub-through hole 1024a2; the elastic member 1044 is disposed in the fourth sub-through hole 1024a2, and a diameter of the elastic member 1044 is larger than the aperture of the third sub-through hole 1024a1. Thus, the supporting structure 1024 can be utilized in conjunction with the limiting member 1045 to cooperate in achieving the limitation of the elastic member 1044.

Referring to FIG. 17, the second fixing assembly 102 may further include: a fifth plate body 1022 fixedly connected to the second supporting plate 1021. The fifth plate body 1022 may be disposed on one side of the second supporting plate 1021 proximal to the first fixing assembly 101, and is used to connect to the first fixing assembly 101.

The second supporting plate 1021, the fifth plate body 1022, and the supporting structure 1024 included in the second fixing assembly 102 may be an integral structure. That is, the second supporting plate 1021, the fifth plate body 1022, and the supporting structure 1024 may be manufactured by one manufacturing process. The second supporting plate 1021, the fifth plate body 1022, and supporting structure 1024 may be manufactured by four manufacturing processes respectively; and then, the second supporting plate 1021, the fifth plate body 1022, and the supporting structure 1024 are connected.

Referring to FIG. 17, at least one second connection through hole 102a may be formed in the second fixing assembly 102. Accordingly, at least one fourth connection through hole corresponding to the at least one second connection through hole 102a may be formed in the second body. The second fixing assembly 102 may be connected to the second body of the electronic device by the at least one second connection through hole 102a and the at least one fourth connection through hole. In an exemplary embodiment, two second connection through holes 102a are shown in FIG. 17.

It should be noted that compared to the first possible implementation, the second possible implementation has the advantages of reducing the size of the assembly and reducing the number of material parts, which in turn saves the cost of the product.

In addition, these above two possible implementations only describe the specific structural forms of the second connector and the second fixing assembly separately, and the other parts of the structure of the rotating shaft mechanism corresponding to these two different implementations are the same, and the structure of the other parts will be described in detail below.

Figure 8:
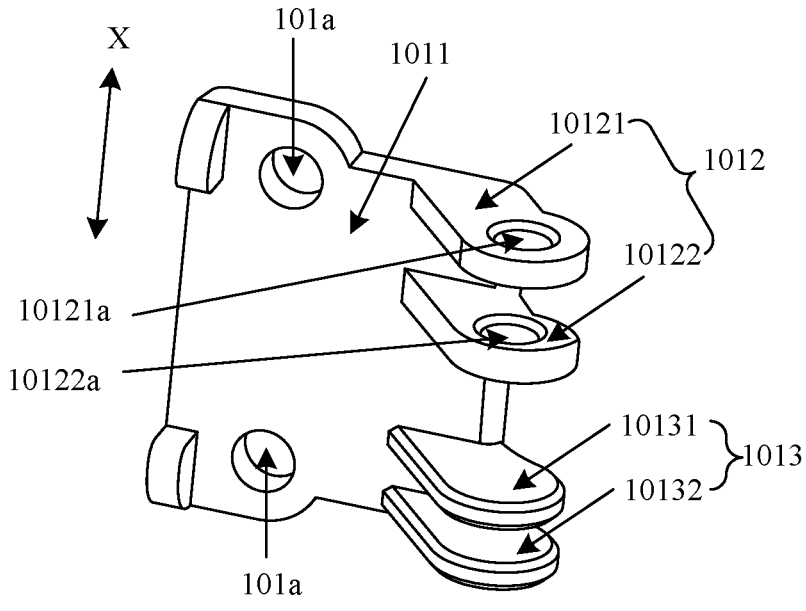
FIG. 8 is a schematic structure diagram of a first fixing assembly according to an embodiment of the present disclosure.

FIG. 8 is a schematic structure diagram of a first fixing assembly according to an embodiment of the present disclosure. Referring to FIG. 8, the first fixing assembly 101 may include: a first supporting plate 1011, and a connecting plate 1012 fixedly connected to the first supporting plate 1011. The connecting plate 1012 may be perpendicular to the first supporting plate 1011, and is disposed on one side of the first supporting plate 1011 proximal to the second fixing assembly 102. The connecting plate 1012 may be rotatably connected to the first connector 103.

Optionally, the first connector 103 may be a rod-shaped structure, for example, may be a pin. The connecting plate 1012 may include a first plate body 10121 and a second plate body 10122 which are spaced apart in the target direction. The first plate body 10121 may be parallel to the second plate body 10122, and a distance between the first plate body

10121 and the second plate body 10122 may be less than or equal to the length of the first connector 103 in the target direction X.

One end of the second connector 104 may be disposed between the first plate body 10121 and the second plate body 10122. Referring to FIG. 8, second through hole 10121a may be formed in the first plate body 10121, and third through hole 10122a may be formed in the second plate body 10122. Referring to FIGS. 3 and 11, a fourth through hole 104a may be formed in one end of the second connector 104. Since the distance between the first plate body 10121 and the second plate body 10122 is less than or equal to the length of the first connector 103 in the target direction X, the first connector 103 may be disposed in the second through hole 10121a, the third through hole 10122a, and the fourth through hole 104a to connect the first fixing assembly 101 with the second connector 104.

In the embodiment of the present disclosure, the first supporting plate 1011, the connecting plate 1012, and the limiting plate 1013 included in the first fixing assembly 101 may be an integral structure. That is, the first supporting plate 1011, the connecting plate 1012, and the limiting plate 1013 may be manufactured by one manufacturing process. The first supporting plate 1011, the connecting plate 1012, and the limiting plate 1013 may be manufactured by three manufacturing processes respectively; and then, the first supporting plate 1011, the connecting plate 1012, and the limiting plate 1013 are connected.

Referring to FIG. 8, the first fixing assembly 101 may further include: a limiting plate 1013 fixedly connected to the first supporting plate 1011. The limiting plate 1013 may be disposed on one side of the first supporting plate 1011 proximal to the second fixing assembly 102, and a gap may be defined between the limiting plate 1013 and the connecting plate 1012 in the target direction X. By disposing the limiting plate 1013, the second fixing assembly 102, and the first fixing assembly 101 can be prevented from moving relatively in the target direction X, such that the stability of the connection between the first fixing assembly 101 and the second fixing assembly 102 is ensured.

In addition, since the gap is defined (the gap may be a reserved hollow region a) between the limiting plate 1013 and the connecting plate 1012 in the target direction X, the external circuit of the electronic device may pass through the gap to be disposed in the second body of the electronic device, avoiding damages to the external circuit.

Referring to FIG. 8, the limiting plate 1013 may include: a third plate body 10131 and a fourth plate body 10132 which are spaced apart in the target direction X and are opposite to each other, wherein the fifth plate body 1022 of the second fixing assembly 103 may be disposed between the third plate body 10131 and the fourth plate body 10132.

The fifth plate body 1022 in the second fixing assembly 102 is disposed between the third plate body 10131 and the fourth plate body 10132 in the first fixing assembly 101, such that the first fixing assembly 101 and the second fixing assembly 102 are prevented from relatively shaking in the target direction X, thereby ensuring the stability of the rotating shaft mechanism Referring to FIG. 8, at least one first connection through hole 101a may be formed in the first fixing assembly 101. Accordingly, at least one third connection through hole corresponding to the at least one first connection through hole 101a may be formed in the first body of the electronic device. The first fixing assembly 101 may be connected to the first body of the electronic device by the at least one first connection through hole 101a and the at least one third connection through hole. In an exemplary embodiment, two first connection through holes 101a are shown in FIG. 8.

For each of the first connection through holes 101a and the third connection through hole corresponding to the first connection through hole 101a, one of the first connection through hole 101a and the third connection through hole may be a light hole, and the other may be a threaded hole. A screw may pass through the light hole first and then through the threaded hole to connect the first fixing assembly 101 to the first body. In an exemplary embodiment, the first connection through hole 101a may be a light hole, and the third connection through hole may be a threaded hole.

For each of the second connection through holes 102a and the fourth connection through hole corresponding to the second connection through hole 102a, one of the second connection through hole 102a and the fourth connection through hole may be a light hole, and the other may be a threaded hole. A screw may pass through the light hole first and then through the threaded hole to connect the second fixing assembly 102 to the second body. In an exemplary embodiment, the second connection through hole 102a may be a light hole, and the fourth connection through hole may be a threaded hole.

In summary, the present disclosure provides the rotating shaft mechanism of the electronic device, and the first fixing assembly and the second fixing assembly in the rotating shaft mechanism are connected to each other by the first connector and the second connector. The hollow region can be reserved in the rotating shaft mechanism as the first connector and the second connector may be shorter. Thus, the external circuit of the electronic device may pass through the hollow region and be disposed in the second body of the electronic device. The second body can protect the external circuit to avoid damages to the external circuit, such that the reliability of the electronic device is higher. In addition, since the external circuit is disposed in the second body of the electronic device, the better aesthetics of the electronic device is ensured.

Figure 10:
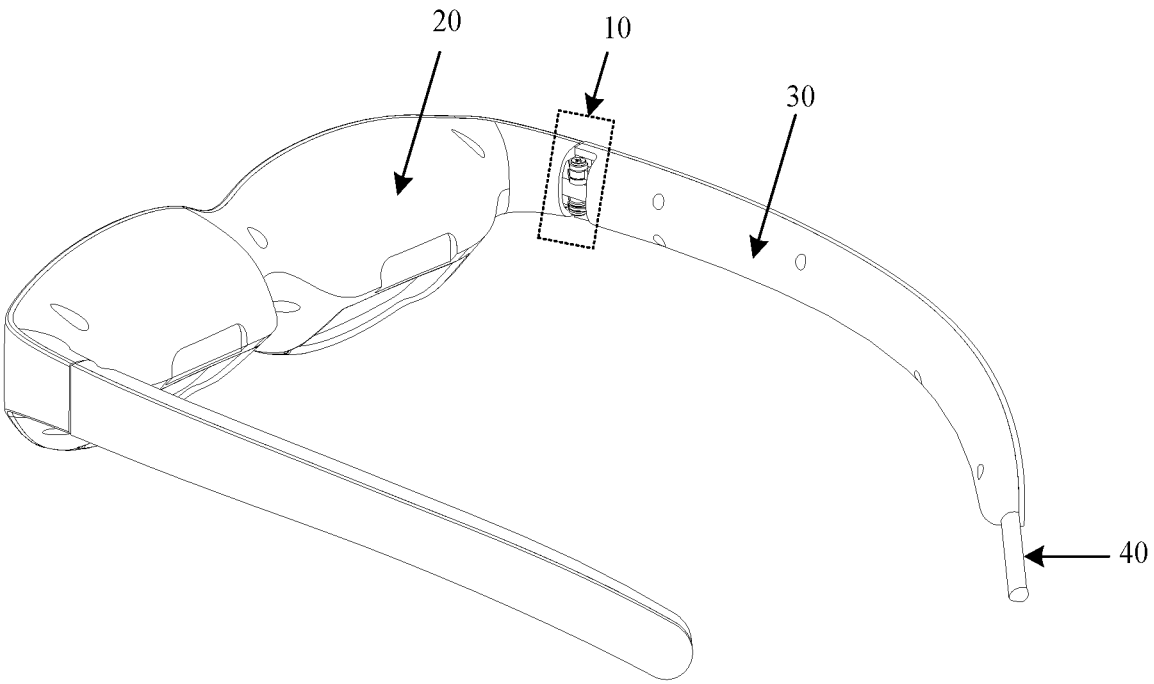
FIG. 10 is a schematic structure diagram of an electronic device according to an embodiment of the present disclosure.

FIG. 10 is a schematic structure diagram of an electronic device according to an embodiment of the present disclosure. Referring to FIG. 10, the electronic device may include: a first body 20, a second body 30, and the rotating shaft mechanism 10 according to any of the above embodiments.

Optionally, the electronic device may further include: an electronic element and an external circuit 40 connected to the electronic element. The electronic element may be disposed in the first body 20; and one end of the external circuit 40 may be connected to the electronic element, and the other end of the external circuit 40 passes through the hollow region in the rotating shaft mechanism 10 and be disposed in the second body 30. Here, the hollow region may include: a region not shielded by the first connector 103 in the first fixing assembly 101 of the rotating shaft mechanism 10, and a region not shielded by the second connector 104 in the second fixing assembly 102 of the rotating shaft mechanism 10.

In the embodiment of the present disclosure, the electronic device may be a wearable device. For example, referring to FIG. 10, the wearable device may be a wearable device like a pair of glasses. The wearable device may further include: a display screen. The first body 20 may be a casing for encapsulating the display screen. The second body 30 may be a temple of the wearable device.

Optionally, the wearable device may be a virtual reality (VR) device or an augmented reality (AR) device.

In summary, the embodiment of the present disclosure provides the electronic device, and the first body and the second body of the electronic device may be rotatably connected to each other by the rotating shaft mechanism. The hollow region can be reserved in the rotating shaft mechanism as the first connector and the second connector in the rotating shaft mechanism may be shorter. Thus, the external circuit of the electronic device may pass through the hollow region and be disposed in the second body. The second body can protect the external circuit to avoid damages to the external circuit, such that the reliability of the electronic device is higher. In addition, since the external circuit is disposed in the second body of the electronic device, the aesthetics of the electronic device is better.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A rotating shaft mechanism of an electronic device, the rotating shaft mechanism comprising:
    a first fixing assembly, configured to be fixedly connected to a first body of the electronic device;
    a second fixing assembly, configured to be fixedly connected to a second body of the electronic device; and
    a first connector and a second connector, wherein the first connector is rotatably connected to the first fixing assembly and one end of the second connector, and the other end of the second connector is fixedly connected to the second fixing assembly;
    wherein a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly; and
    the second connector comprises: a first connecting portion having a rod shape, an elastic member, and a limiting member; wherein one end of the first connecting portion is rotatably connected to the first fixing assembly by the first connector, the limiting member is provided at the other end of the first connecting portion; and the elastic member is arranged on the first connecting portion and is configured to be compressed in a case that a rotation angle exists between the first fixing assembly and the second fixing assembly;
    wherein an annular groove is arranged on the other end of the first connecting portion, the limiting member being connected with the first connecting portion through the annular groove.

2. The rotating shaft mechanism according to claim 1, wherein the second fixing assembly comprises: a second supporting plate and a supporting structure fixedly connected to the second supporting plate;
    wherein a seventh through hole is formed in the supporting structure, a part of the first connecting portion, the elastic member, and the limiting member being disposed in the seventh through hole, and an axis of the seventh through hole being parallel to the second supporting plate.

3. The rotating shaft mechanism according to claim 2, wherein the seventh through hole comprises: a third sub-through hole and a fourth sub-through hole which are coaxial, the third sub-through hole being proximal to the first fixing assembly relative to the fourth sub-through hole, and an aperture of the third sub-through hole being less than an aperture of the fourth sub-through hole; wherein the elastic member is disposed in the fourth sub-through hole, and a diameter of the elastic member is larger than the aperture of the third sub-through hole.

4. The rotating shaft mechanism according to claim 1, wherein the first fixing assembly comprises: a first supporting plate and a connecting plate fixedly connected to the first supporting plate;

wherein the connecting plate is perpendicular to the first supporting plate, is disposed on one side of the first supporting plate proximal to the second fixing assembly, and is rotatably connected to the first connector.

5. The rotating shaft mechanism according to claim 4, wherein the first connector is a rod-shaped structure;

the connecting plate comprises a first plate body and a second plate body which are spaced apart in the target direction, wherein the first plate body is parallel to the second plate body, and a distance between the first plate body and the second plate body is less than or equal to the length of the first connector in the target direction;

one end of the second connector is disposed between the first plate body and the second plate body; and a second through hole is formed in the first plate body, a third through hole is formed in the second plate body, and a fourth through hole is formed in one end of the second connector, wherein the first connector is disposed in the second through hole, the third through hole, and the fourth through hole.

6. The rotating shaft mechanism according to claim 4, wherein the first fixing assembly further comprises: a limiting plate fixedly connected to the first supporting plate;

wherein the limiting plate is disposed on one side of the first supporting plate proximal to the second fixing assembly, and a gap is defined between the limiting plate and the connecting plate in the target direction.

7. The rotating shaft mechanism according to claim 6, wherein the limiting plate comprises: a third plate body and a fourth plate body which are spaced apart in the target direction and are opposite to each other; and the second fixing assembly comprises: a second supporting plate and a fifth plate body fixedly connected to the second supporting plate, wherein the fifth plate body is disposed on one side of the second supporting plate proximal to the first fixing assembly, and is disposed between the third plate body and the fourth plate body.

8. The rotating shaft mechanism according to claim 1, wherein at least one first connection through hole is formed in the first fixing assembly, wherein each of the at least one first connection through hole is configured to be connected to the first body of the electronic device; and at last one second connection through hole is formed in the second fixing assembly, wherein each of the at least one second connection through hole is configured to be connected to the second body of the electronic device.

9. An electronic device, comprising: a first body, a second body, and a rotating shaft mechanism comprising a first fixing assembly, configured to be fixedly connected to a first body of the electronic device; a second fixing assembly, configured to be fixedly connected to a second body of the electronic device; and a first connector and a second connector, wherein the first connector is rotatably connected to the first fixing assembly and one end of the second connector, and the other end of the second connector is fixedly connected to the second fixing assembly; wherein a length of the first connector in a target direction and a length of the second connector in the target direction are both less than a length of the first fixing assembly in the target direction, and are both less than a length of the second fixing assembly in the target direction, the target direction being an extending direction of a rotation axis of the first fixing assembly and the second fixing assembly; wherein the first body and the second body are rotatably connected by the rotating shaft mechanism; and the second connector comprises: a first connecting portion having a rod shape, an elastic member, and a limiting member; wherein one end of the first connecting portion is rotatably connected to the first fixing assembly by the first connector, the limiting member is provided at the other end of the first connecting portion; and the elastic member is arranged on the first connecting portion and is configured to be compressed in a case that a rotation angle exists between the first fixing assembly and the second fixing assembly;

wherein an annular groove is arranged on the other end of the first connecting portion, the limiting member being connected with the first connecting portion through the annular groove.

10. The electronic device according to claim 9, further comprising: an electronic element and an external circuit connected to the electronic element; wherein the electronic element is disposed in the first body, one end of the external circuit is connected to the electronic element, and the other end of the external circuit passes through a hollow region in the rotating shaft mechanism to be disposed in the second body;

wherein the hollow region comprises: a region not shielded by the first connector in the first fixing assembly of the rotating shaft mechanism, and a region not shielded by the second connector in the second fixing assembly of the rotating shaft mechanism.

11. The electronic device according to claim 9, wherein the electronic device is a wearable device, the wearable device further comprising: a display screen;

wherein the first body is a casing for encapsulating the display screen, and the second body is a temple of the wearable device.

12. The electronic device according to claim 11, wherein the wearable device is a virtual reality device or an augmented reality device.

* * * * *